United States Patent
Xu et al.

(10) Patent No.: US 11,900,180 B2
(45) Date of Patent: Feb. 13, 2024

(54) KEYWORD-BASED PRESENTATION OF NOTIFICATIONS

(71) Applicant: Citrix Systems, Inc., Fort Lauderdale, FL (US)

(72) Inventors: Ke Xu, Nanjing (CN); Zhaozhao Xiong, Nanjing (CN); Zongpeng Qiao, Nanjing (CN); Lu Sun, Nanjing (CN)

(73) Assignee: Citrix Systems, Inc., Fort Lauderdale, NJ (US)

( * ) Notice: Subject to any disclaimer, the term of this patent is extended or adjusted under 35 U.S.C. 154(b) by 183 days.

(21) Appl. No.: 17/386,777

(22) Filed: Jul. 28, 2021

(65) Prior Publication Data

US 2023/0004450 A1    Jan. 5, 2023

Related U.S. Application Data

(63) Continuation of application No. PCT/CN2021/103563, filed on Jun. 30, 2021.

(51) Int. Cl.
*G06F 9/54* (2006.01)
*G06F 9/451* (2018.01)

(52) U.S. Cl.
CPC .............. *G06F 9/542* (2013.01); *G06F 9/451* (2018.02)

(58) Field of Classification Search
CPC ..... G06F 9/542; G06F 16/1734; H04L 41/06; H04L 41/0604
USPC ....................................................... 719/318
See application file for complete search history.

(56) References Cited

U.S. PATENT DOCUMENTS

| 8,676,830 | B2 * | 3/2014 | Mukherjee ............ G06F 16/951 707/768 |
| 8,938,650 | B2 * | 1/2015 | Tanaka ................ H04L 41/0613 714/48 |
| 9,692,848 | B2 * | 6/2017 | Agnew ................. H04L 67/306 |
| 2012/0101985 | A1 | 4/2012 | Kemp et al. |

FOREIGN PATENT DOCUMENTS

| CN | 103080936 A | 5/2013 |
| CN | 105187641 A | 12/2015 |
| CN | 107958015 A | 4/2018 |
| CN | 111064654 A | 4/2020 |

OTHER PUBLICATIONS

International Search Report and Written Opinion dated Mar. 28, 2022 for International Patent Application No. PCT/CN2021/103563.

* cited by examiner

*Primary Examiner* — Andy Ho

(57) ABSTRACT

One disclosed method involves accessing, by a computing system and using access credentials associated with a user, data associated with systems of record, generating, by the computing system, a plurality of notifications of events indicated by the data, determining, by the computing system, that the user selected at least one keyword, determining, by the computing system, that a first notification of the plurality of notifications relates to the at least one keyword, and causing, by the computing system and based at least in part on the first notification relating to the at least one keyword, a client device operated by the user to present the first notification.

20 Claims, 12 Drawing Sheets

KEYWORD-BASED PRESENTATION OF NOTIFICATIONS

CROSS-REFERENCE TO RELATED APPLICATIONS

This application is a continuation of and claims the benefit under 35 U.S.C. § 120 and 35 U.S.C. § 365(c) to International Application PCT/CN2021/103563, entitled KEYWORD-BASED PRESENTATION OF NOTIFICATIONS, with an international filing date of Jun. 30, 2021, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method may involve a computing system accessing, using access credentials associated with a user, data associated with systems of record, generating a plurality of notifications of events indicated by the data, determining that the user selected at least one keyword, determining that a first notification of the plurality of notifications relates to the at least one keyword, and causing, based at least in part on the first notification relating to the at least one keyword, a client device operated by the user to present the first notification.

In some disclosed embodiments, a computing system may comprise at least one processor at least one computer-readable medium encoded with instructions which, when executed by the at least one processor, cause the computing system to access, using access credentials associated with a user, data associated with systems of record, generate a plurality of notifications of events indicated by the data, determine that the user selected at least one keyword, determine that a first notification of the plurality of notifications relates to the at least one keyword, and cause, based at least in part on the first notification relating to the at least one keyword, a client device operated by the user to present the first notification.

In some disclose embodiments, at least one non-transitory computer-readable medium may be encoded with instructions which, when executed by at least one processor of a computing system, cause the computing system to access, using access credentials associated with a user, data associated with systems of record, generate a plurality of notifications of events indicated by the data, determine that the user selected at least one keyword, determine that a first notification of the plurality of notifications relates to the at least one keyword, and cause, based at least in part on the first notification relating to the at least one keyword, a client device operated by the user to present the first notification.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1A:
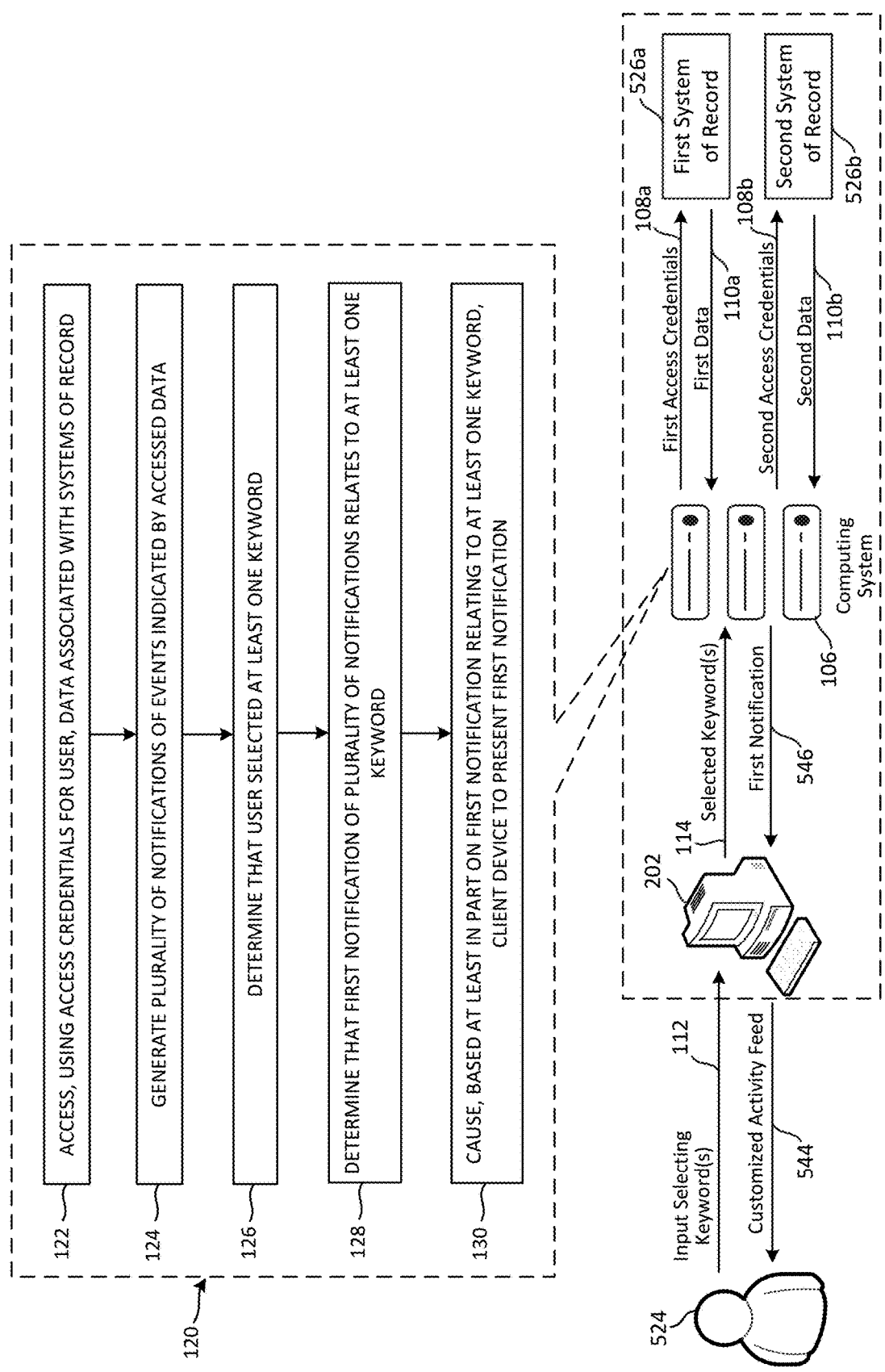
FIG. 1A shows an example implementation of a system for a keyword-based presentation of notifications in accordance with some embodiments of the present disclosure.
Figure 1B:
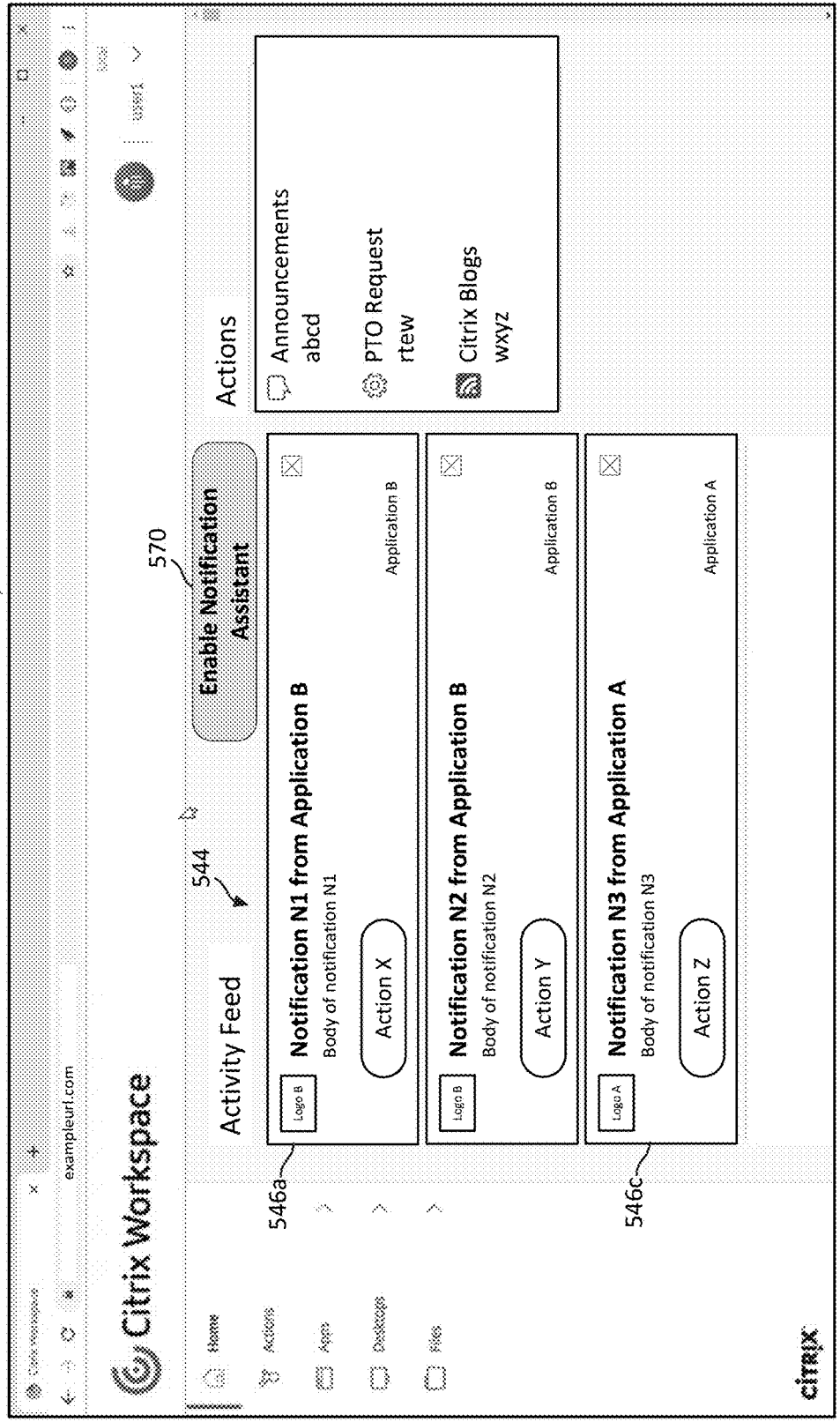
FIG. 1B shows an example display screen presenting notifications in a user's activity feed.

Certain systems present notifications when events occur. Such systems may be a multi-resource access system 500 (described below in relation to FIG. 5A in Section E) that provides many benefits, including providing a user 524 (shown in FIGS. 5B and 5C) with the ability to seamlessly access multiple different resources from a user interface of a single application, e.g., the resource access application 522 shown in FIGS. 5B and 5C. Such resources may be applications that are hosted remotely, content that is available from a cloud environment, virtual desktops providing access to other devices, and other resources. The multi-resource access system 500 may generate notifications when events occur at the resources that the user 524 has access to. For example, a first application may receive a paid time off (PTO) request, which the user 524 is responsible for approving, and a notification corresponding to receipt of the request may be presented to the user 524 via the resource access application 522. Such notifications may be presented to the user 524 via an activity feed included in a user interface screen of the resource access application 522. An example user interface screen 150 including an activity feed 544 in which a number of notifications 546a, 546b, 546c are presented is shown in FIG. 1B.

Given the number of resources the user 524 can access and given the number of events occurring at each of the resources, a large number of notifications 546 may be presented in the user's activity feed 544. At some point, the number of notifications 546 may hinder the user's productivity, such as by disturbing the user during performance of a significant task. The inventors have recognized and appreciated that receiving notifications 546 from different resources without any sequence or priority may disrupt a user's productivity. Some of the notifications 546 may be urgent, but others may not need immediate action or attention from the user.

Offered is a technique that enables the user 524 to control the order in which notifications 546 are presented in an activity feed 544. In particular, the order of the notifications 546 may be determined based on keywords selected by the user 524. For example, the user 524 may select a first keyword with a highest priority, and when the multi-resource access system 500 generates a first notification 546a relating to the first keyword, the resource access application 522 may present the first notification 546a at the top of the activity feed 544. Continuing the example, the user 524 may select a second keyword with a second highest priority, and when the multi-resource access system 500 generates a second notification 546b relating to the second keyword, the resource access application 522 presents the second notification 546b after the first notification 546a in the activity feed 544.

Customizing the order of notifications 546 based on the user's selected keywords, enables the user 524 to control which notifications 546 are prioritized in the user's activity feed 544. Thus, if the user 524 is working on a significant task, but also wants to keep track of any events that occur for another task, then the user 524 can prioritize presentation of notifications 546 for the other task by selecting a keyword(s) relating to the other task. The techniques of the present disclosure enables the user 524 to provide the user's own keyword or select a keyword from a list of keywords that may be generated based on the user's past interactions with the activity feed 544 and/or the types of notifications 546 received by the user 524.

For purposes of reading the description of the various embodiments below, the following descriptions of the sections of the specification and their respective contents may be helpful:

Section A provides an introduction to example embodiments of a system for keyword-based presentation of notifications;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the system for keyword-based presentation of notifications that was introduced in Section A; and Section G describes example implementations of methods, systems/devices, and computer-readable media in accordance with the present disclosure.

A. Introduction to Illustrative Embodiments of a System Enabling a Keyword-Based Presentation of Notifications FIG. 1A shows an example implementation of a computing environment 100 with which some aspects of the present disclosure may be implemented. As shown, the computing environment may include a client device 202, a computing system 106 (which may, for example, be implemented by one or more servers 204), and a plurality of systems of record 526 (sometimes referred to herein as "resources") with which the computing system 106 may interact on behalf of the user 524 of the client device 202. Examples of components that may be used to implement the client device 202 and the servers 204, as well as examples of computing environments in which such components may be deployed, are described below in connection with FIGS. 2-4. In some implementations, the computing system 106 may correspond to one or more components of the resource management services 502 described below in connection with FIGS. 5A-C in Section E.

In some implementations, the computing system 106 may perform a process 120 shown in FIG. 1A. As described below in connection with FIGS. 5B and 5C in Section E, the user 524 may access resources 526 at the client device 202 via the resource access application 522. The user 524 may log in to the resource access application 522 using his/her credentials (e.g., username, password, pin, dual-authentication techniques, fingerprint, etc.) to gain access to the resources via the single user interface of the resource access application 522. While the user 524 is logged in to the resource access application 522, the computing system 106, which may include one or more components of the resource management services 502, may generate notifications 546 for events that may occur at the resources 526.

At a step 122 of the process 120, the computing system 106 may access, using access credentials for the user 524, data associated with the systems of record 526. As described in connection with FIG. 5C, for example, in some implementations, the data integration provider service 530 may use access credentials associated with the user 524 (e.g., retrieved from the credential wallet service 532) to access various systems of record 526 (e.g., via application programming interface (API) calls to the systems of record 526) on behalf of the user 524, and retrieve data from those systems of record 526 that is indicative of events that may have occurred and may be pertinent to the user 524. As shown in FIG. 1A, the computing system 106 may use first access credentials 108a to access first data 110a relating to a first event(s) from a first system of record 526a, and may use second access credentials 108b to access second data 110b relating to a second event(s) from a second system of record 526b.

At a step 124 of the process 120, the computing system 106 may generate a plurality of notifications 546 of events indicated by the accessed data. For example, the first data 110a from the first system of record 526a may indicate occurrence of a first event. The computing system 106 may generate a first notification 546*a* corresponding to the first event. The computing system 106 may generate the first notification 546*a* using the first data 110*a*, such that the first notification 546*a* may include information included in the first data 110*a*, for example, description of the occurred event, a time the event occurred, an application/resource associated with the occurred event, etc. As a further example, the second data 110*b* from the second system of record 526*b* may indicate occurrence of a second event. In a similar manner, the computing system 106 may generate a second notification 546*b* corresponding to the second event.

Figure 1C:
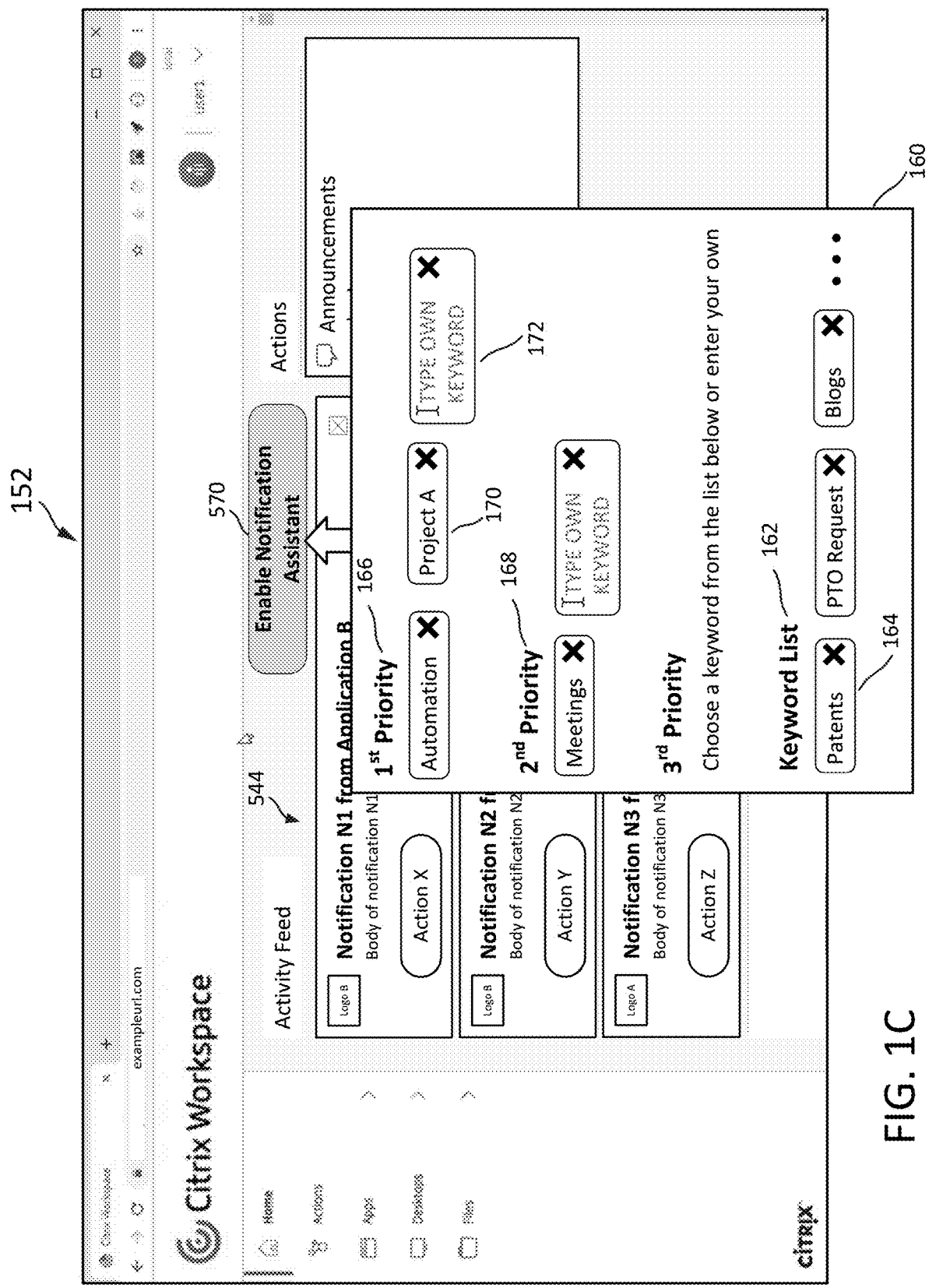
FIG. 1C shows an example display screen that includes user interface elements enabling a user of a client device to select one or more keywords for customizing presentation of notifications in the user's activity feed.

In accordance with some aspects of the present disclosure, the user 524 may provide an input selecting one or more keywords 112 via a user interface presented by the client device 202. FIG. 1C shows a user interface screen 152 including a user interface element 160 via which the user 524 may select the keyword(s). Further details of the user interface screen 152 are described below in this section. The client device 202 may send data representing the selected keyword(s) 114 to the computing system 106. The keyword(s) selected by the user 524 may be used by the computing system 106 to determine how to present notifications to the user 524. In some implementations, the input selecting the keyword(s) 112 may be received by the client device 202 and the data representing the selected keyword(s) 114 may be sent to the computing system 106 at some time before the computing system 106 accesses the data associated with the systems of record 526 (at the step 122 of the process 120). In other implementations, the input selecting the keyword(s) 112 may be received by the client device 202 and the data representing the selected keyword(s) 114 may be sent to the computing system 106 at some time after the computing system 106 accesses the data associated with the systems of record 526 (at the step 122 of the process 120).

Based on receiving the data representing the selected keyword(s) 114, at a step 126 of the process 120, the computing system 106 may determine that the user 524 selected at least one keyword.

At a step 128 of the process 120, the computing system 106 may determine that a first notification 546*a* of the plurality of notifications relates to the at least one keyword (in the selected keyword(s) 114). In some implementations, the computing system 106 may determine that the first notification 546*a* relates to the at least one keyword based on the first notification 546*a* including a word that matches the keyword. In other implementations, the computing system 106 may determine that the first notification 546*a* relates to the at least one keyword based on the first notification 546*a* including a word that is similar (e.g., semantically similar) to the keyword.

At a step 130 of the process 120, the computing system 106 may cause, based at least in part on the first notification 546*a* relating to the at least one keyword, the client device 202 to present the first notification 546*a*. As shown in FIG. 1A, the computing system 106 may send the first notification 546*a* to the client device 202, operated by the user 524, for presentation to the user 524 via the user interface at the client device 202. The user interface may be of the resource access application 522. The first notification 546*a* may be presented in a customized activity feed 544, such that the first notification 546*a* may be presented at the top of the activity feed 544 (i.e. before other notifications 546 that may already be presented in the activity feed 544).

In some cases, the computing system 106 may determine that a second notification 546*b* (corresponding to the second data 110*b*) does not relate to the selected keyword(s) 114. In some implementations, the computing system 106 may not send the second notification 546*b* to the client device 202 for presentation to the user 524 until the user 524 explicitly requests presentation of the second notification 546*b* (or all notifications 546). Thus, when the user 524 is busy, the user 524 may not be disturbed with notifications 546 that are not urgent for the user 524. In other implementations, the computing system 106 may send the second notification 546*b* to the client device 202, and may cause the client device 202 to insert the second notification 546*b* at the bottom of the customized activity feed 544 (i.e., after at least the first notification 546*a* or other notifications 546 already presented in the activity feed 544). In some implementations, the customized activity feed 544 may be organized in two sections—one/top section may present notifications 546 corresponding to the selected keyword(s) 114; and two/bottom section may present notifications 546 that do not correspond to any of the selected keywords 114. In some implementations, the bottom section of the customized activity feed 544 may be hidden (e.g., collapsed) until the user 524 provides an input to view (e.g., expand) the bottom section.

FIG. 1B shows a user interface screen 150 that may be displayed at the client device 202 operated by the user 524 via the resource access application 522. As illustrated in FIG. 1B, the user interface screen 150 may include the customized activity feed 544, and the first notification 546*a* may be presented at the top of the customized activity feed 544. Another example notification 546*c* may be presented at the bottom of the customized activity feed 544, as illustrated in FIG. 1B, where the notification 546*c* may not relate to the selected keyword(s) 114.

The user interface screen 150 may include a user interface element 570 (e.g., a button) labeled, for example, "Enable Notification Assistant." Selection (e.g., via a mouse click, via a keyword input, via a touch screen interface, etc.) of the user interface element 570 may enable the user 524 to provide the input selecting the keyword(s) 112 shown in FIG. 1A. FIG. 1C shows an example user interface screen 152, which may be displayed at the client device 202 via the resource access application 522 in response to the user 524 selecting the user interface element 570.

Selection of the "Enable Notification Assistant" user interface element 570 may cause display of a user interface element 160 (e.g., a pop-up box), as illustrated in FIG. 1C. The user interface element 160 may enable the user 524 to provide one or more inputs selecting one or more keywords to be used in presenting notifications 546 in the user's activity feed 544. As illustrated in FIG. 1C, the user interface element 160 may include a keyword list 162 under which one or more selectable elements corresponding to a keyword may be presented, such as, the selectable element 164 corresponding to the keyword "Patents." In some implementations, selection of the "Enable Notification Assistant" user interface element 570 may enable a plug-in at the resource access application 522 accessed via the client device 202 by the user 524.

In accordance with some implementations of the present disclosure, the user 524 may select keywords to have different priority levels, so that notifications 546 corresponding to the respective keywords are presented in the activity feed 544 according to the priority level. For example, the user 524 may select a first keyword as having a first priority level, and a second keyword as having a second priority level that is lower than the first priority level. Based on the indicated priority levels, the computing system 106 may cause the client device 202 to present, within the activity feed 544, a first notification 546a corresponding to the first keyword/first priority level before a second notification 546b corresponding to the second keyword/second priority level. As illustrated in FIG. 1C, the user 524 may assign different keywords to different priority levels via the user interface element 160. For example, a "Project A" keyword may be assigned a $1^{st}$ priority level, as shown in FIG. 1C. In some implementations, the user 524 may select a selectable element 170 corresponding to the "Project A" keyword 170 from the keyword list 162, and drag the selectable element 170 under a section 166 corresponding to the $1^{st}$ priority level. Similarly, the user 524 may assign another keyword to a $2^{nd}$ priority level, by selecting a selectable element corresponding to the desired keyword, and dragging it to a section 168 corresponding to the $2^{nd}$ priority level.

In some implementations, the keywords in the keyword list 162 may be keywords determined by the computing system 106 and presented to the user 524 as recommended keywords that the user 524 can choose from. Details on how the computing system 106 may determine the recommended keywords are described below in Section F. In some implementations, the user 524 is able to provide his/her own keyword, for example, by entering the keyword in a user interface element 172 (e.g., a text box/field) shown in FIG. 1C. The user 524 may type in a keyword in the user interface element 172 using a physical keyword input connected to the client device 202 or using a virtual keyword input via a touchscreen interface. As further illustrated in FIG. 1C, the user 524 can remove/delete a keyword from a priority level by selecting a "X" icon associated with the selectable element corresponding to the keyword that the user wants to remove/delete. The removed/deleted keyword may automatically appear in the keywords list 162 so that the user 524 may use the keyword again at a later time. In some implementations, the user 524 may also remove/delete a keyword from the keywords list 162 if the user 524 does not want the keyword to appear in the keyword list 162 anymore. As further illustrated in FIG. 1C, there are not presently no keywords assign to a $3^{rd}$ priority level.

Once the user 524 is finished selecting keywords via the user interface element 160, the user 524 may click the "Enable Notification Assistant" user interface element 570 to close the user interface element 160 and save the selected keyword(s) 112. The client device 202 may, at this point, send the data representing the selected keyword(s) 114 to the computing system 106.

In some implementations, the selected keyword(s) 114 may be stored in a profile for the user 524, so that the selected keyword(s) 114 may be subsequently used to present notifications to the user 524 when the user 524 uses the same client device 202, at a later time, or a different client device 202 to access the resource access application 522. In some implementations, for example, the notification service 538 shown in FIG. 5C (or another component of the resource management services 502) may be configured with an API that can be used to store and retrieve the data representing the selected keyword(s) 114. In some implementations, for example, the analytics service 536 (or another component of the resource management services 502) may be configured to determine whether a notification 546 relates to the selected keyword(s) 114.

Additional details and example implementations of embodiments of the present disclosure are set forth below in Section F, following a description of example systems and network environments in which such embodiments may be deployed.

B. Network Environment

Figure 2:
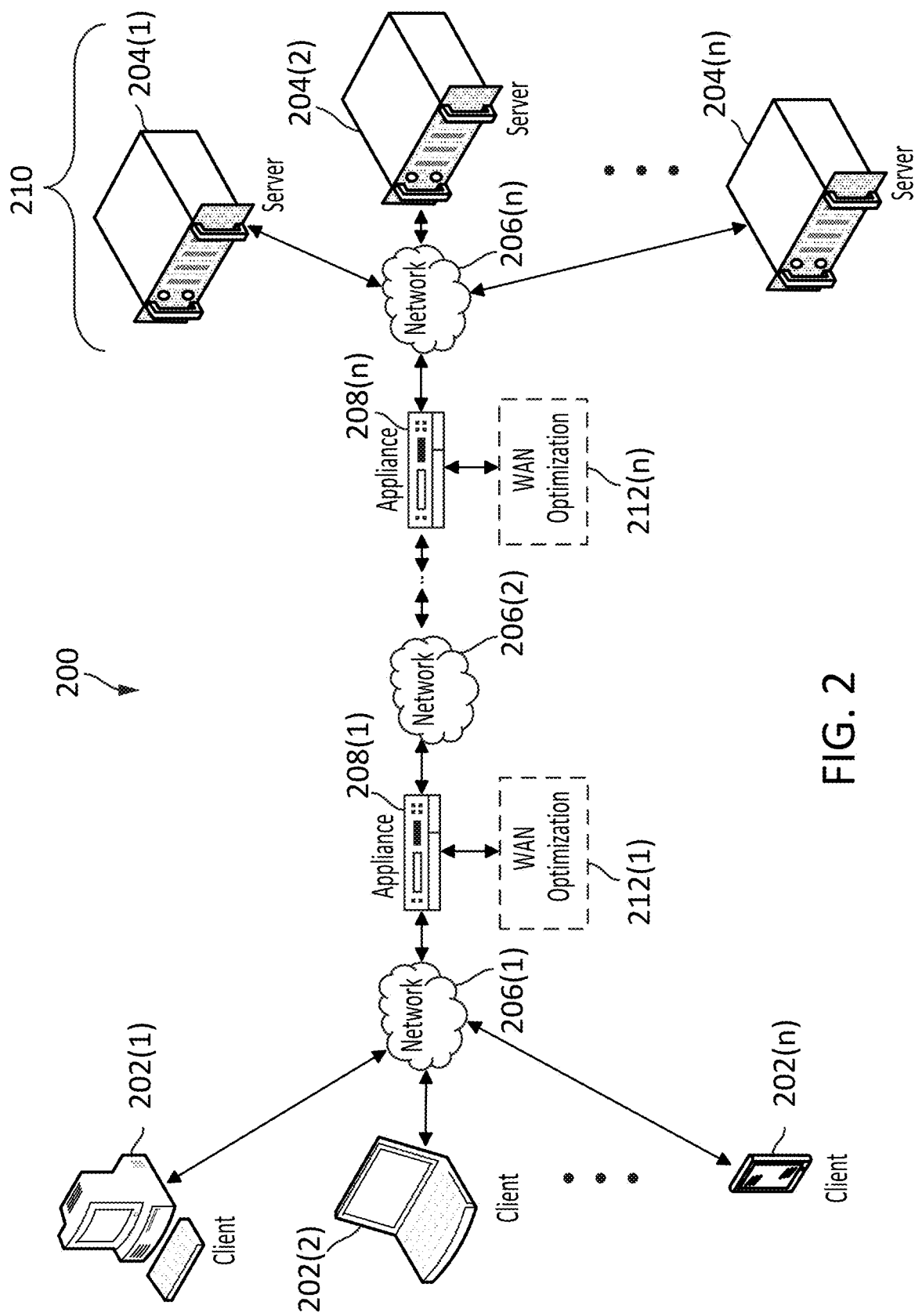
FIG. 2 is a diagram of a network environment in which some embodiments of the user customizable activity feed generation system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
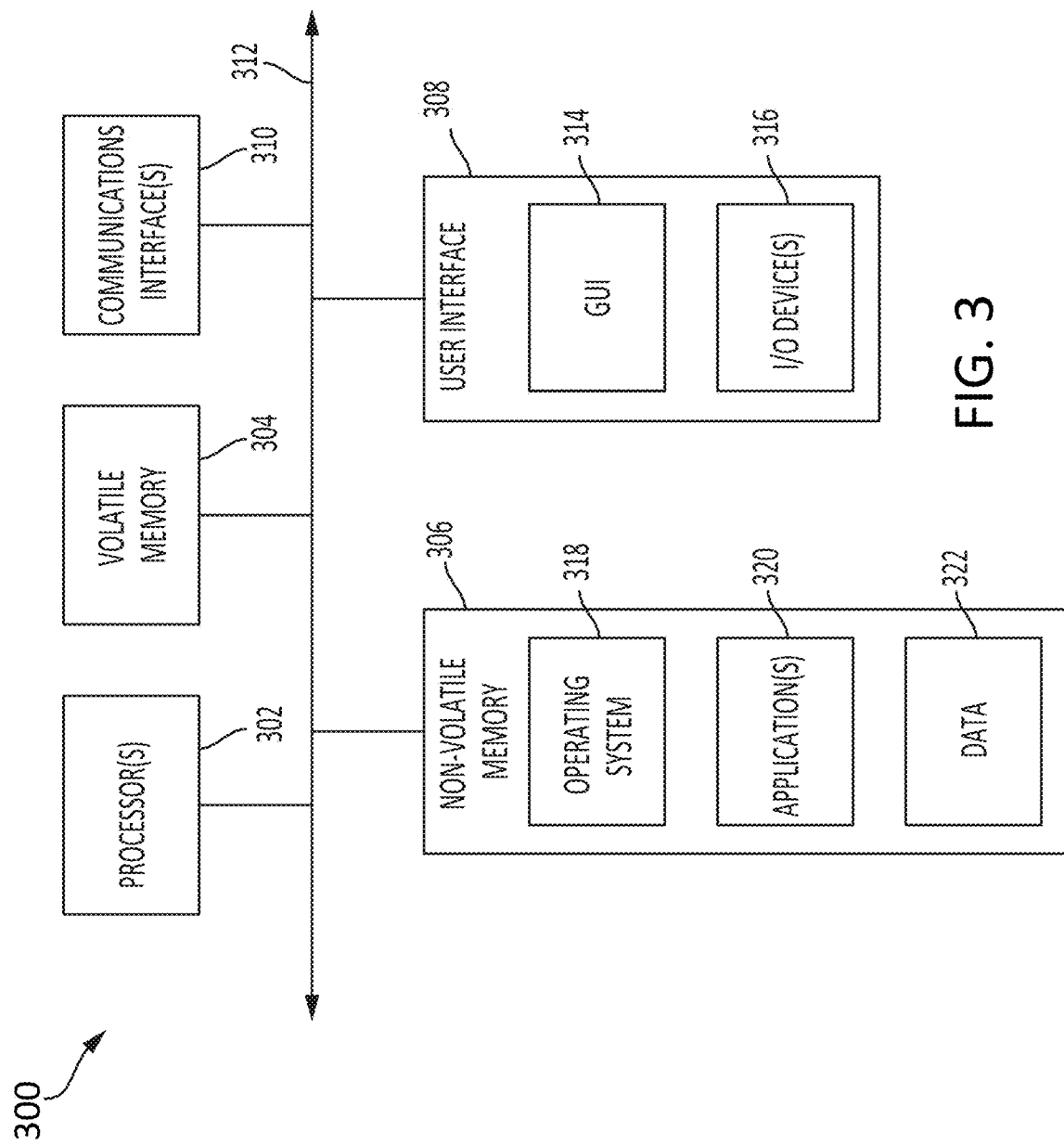
FIG. 3 is a block diagram of a computing system that may be used to implement one or more of the components of the computing environment shown in FIG. 2 in accordance with some embodiments.
Figure 4:
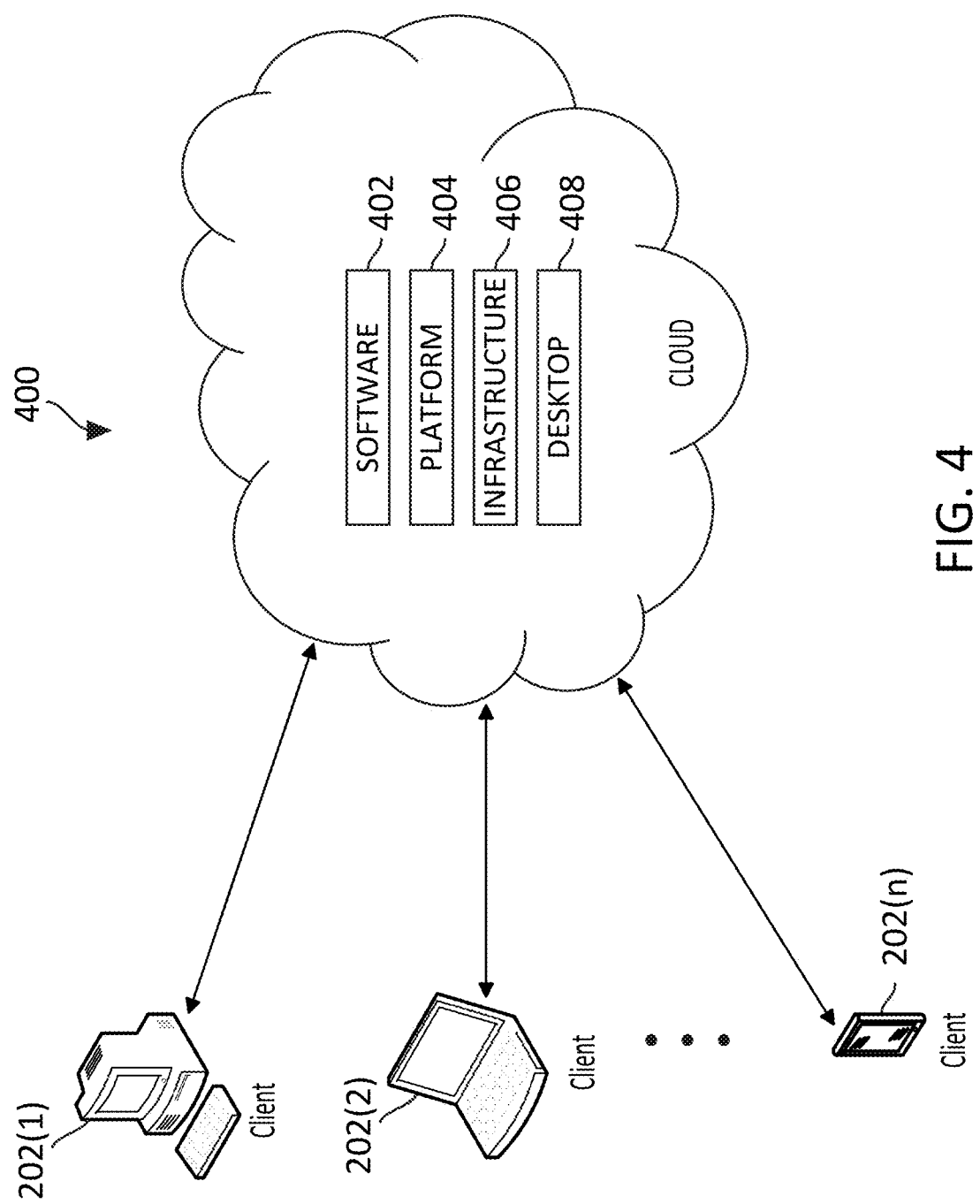
FIG. 4 is a schematic block diagram of a cloud computing environment in which various aspects of the disclosure may be implemented.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

Figure 5A:
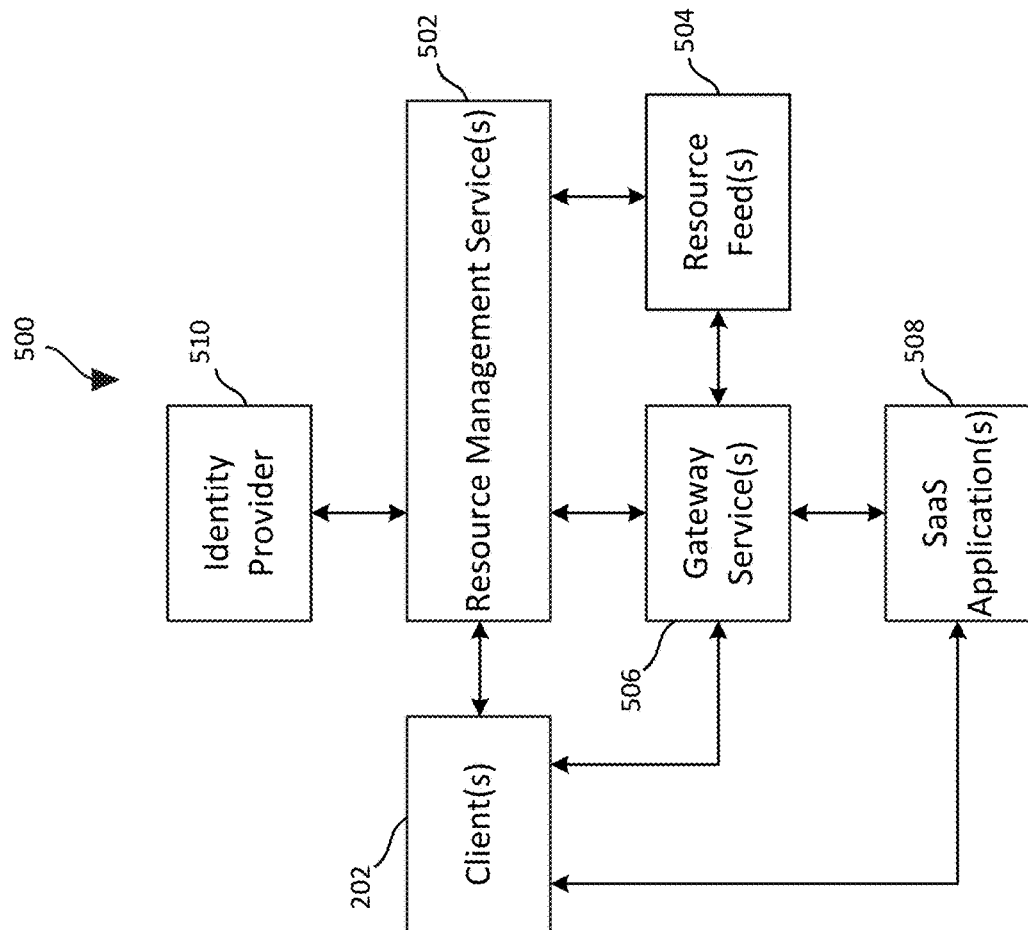
FIG. 5A is a block diagram of an example system in which resource management services may manage and streamline access by clients to resource feeds (via one or more gateway services) and/or software-as-a-service (SaaS) applications.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
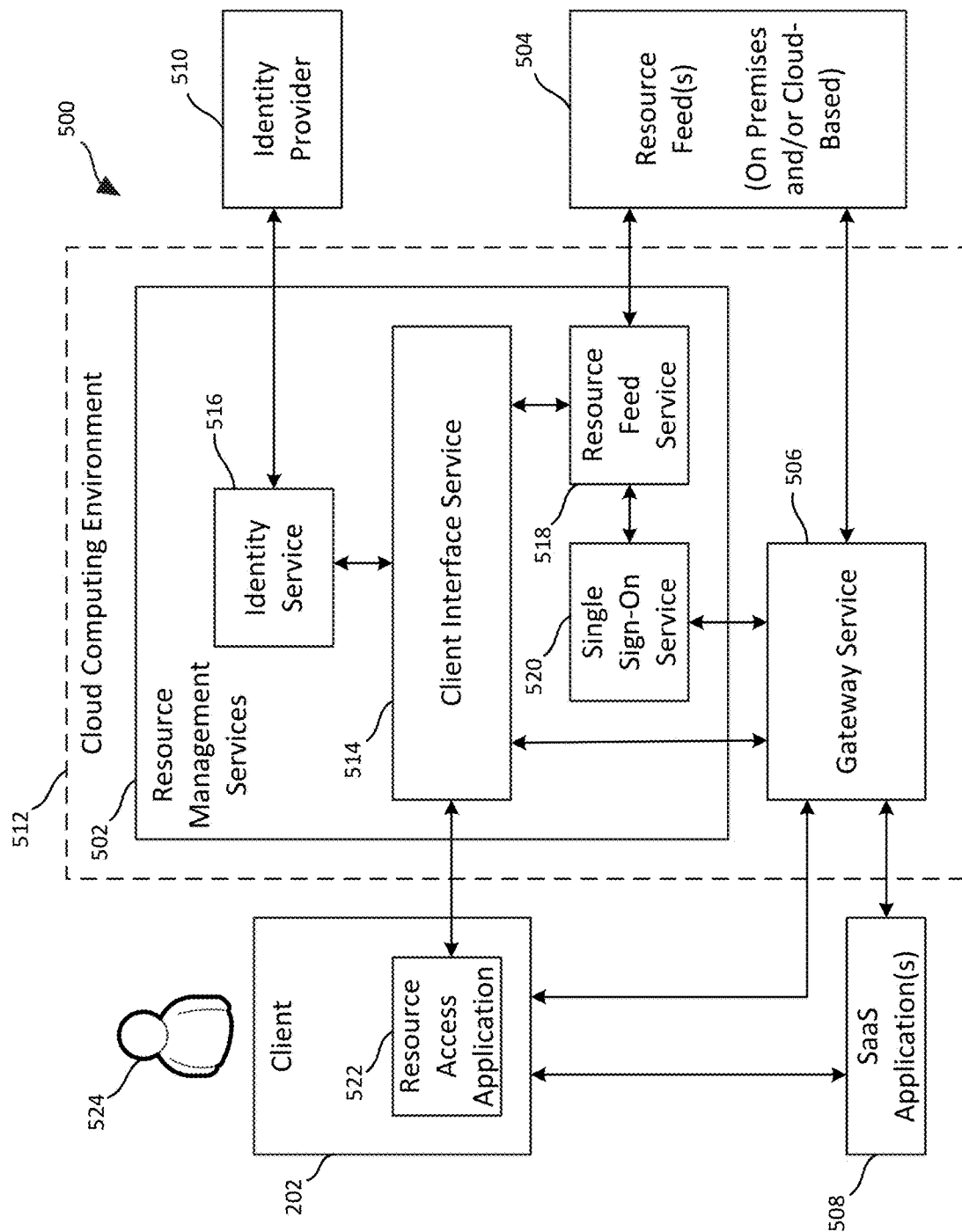
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource application is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
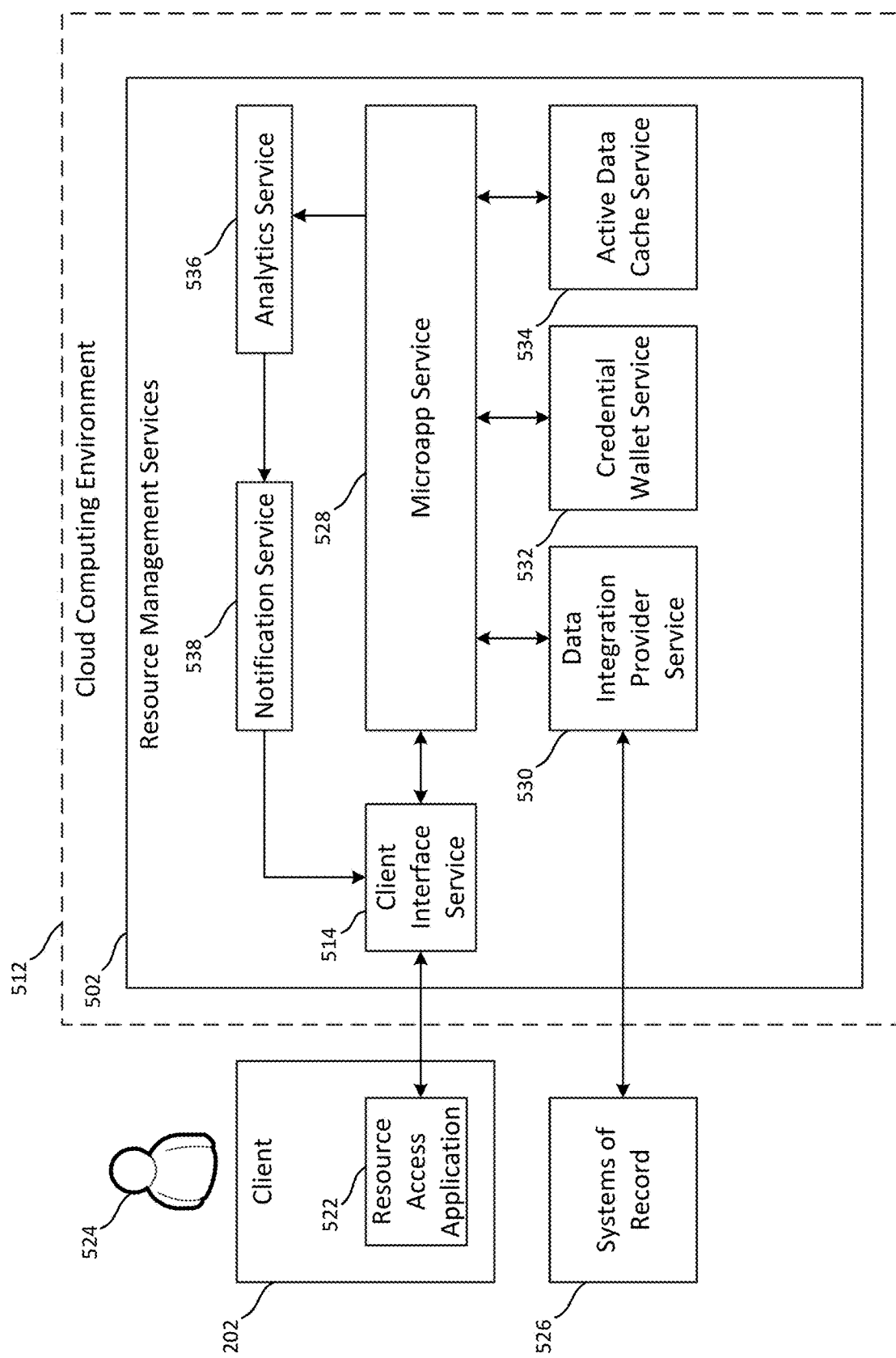
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
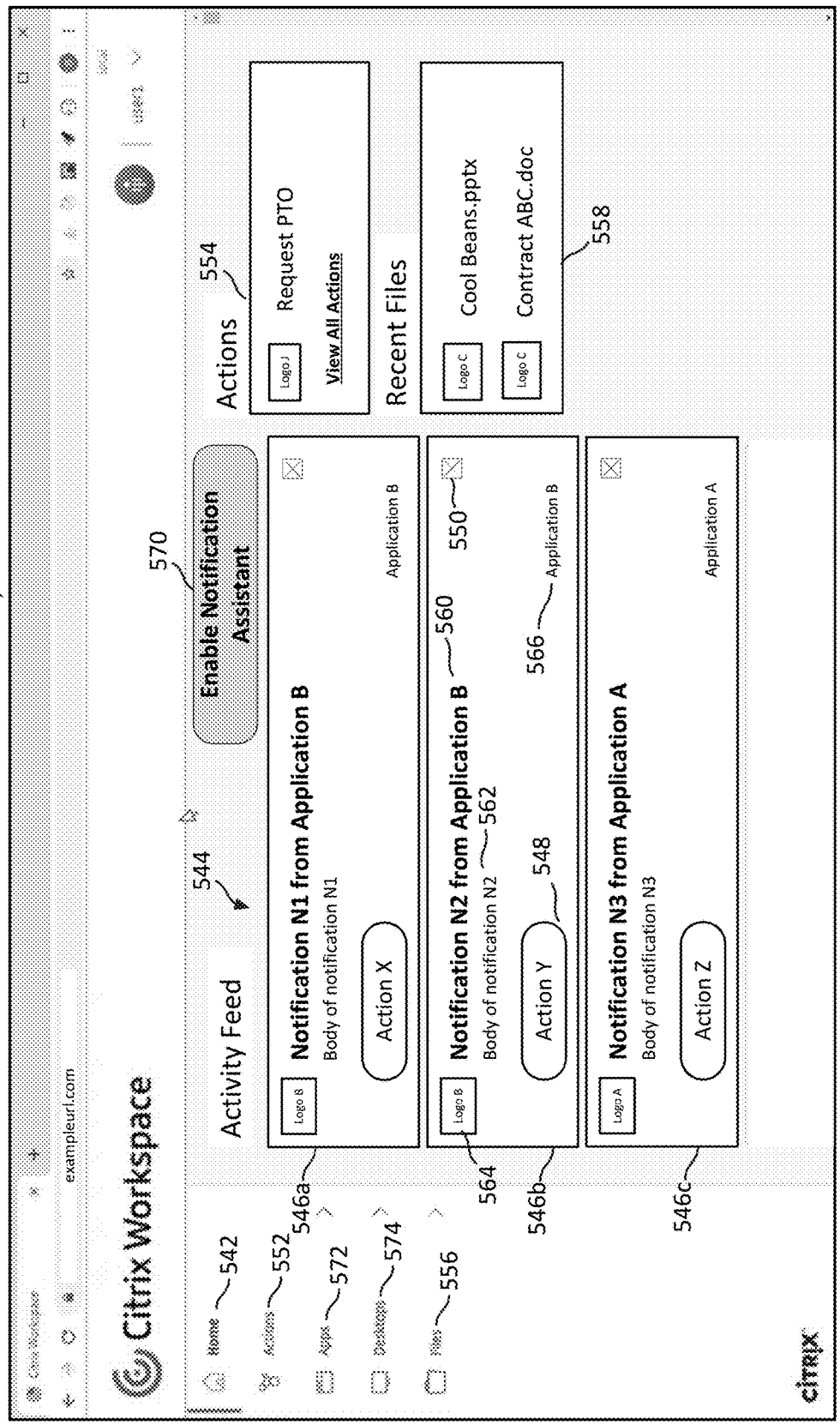
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546a, 546b, 546c about respective events that occurred within various applications/resources to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, Slack, Outlook, etc.) with which the user has accounts, and events that occur within such systems of record may be evaluated to present notifications 546a, 546b, 546c to the user concerning actions that the user can take relating to such events. As shown in FIG. 5D, in some implementations, the notifications 546a, 546b, 546c may include a title 560 and a body 562, and may also include a logo 564 and/or a name 566 of the system of record to which the notification 546 corresponds, thus helping the user understand the proper context with which to decide how best to respond to the notification 546a, for example. In some implementations, the "Enable Notification Assistant" plug-in, accessible using the user interface element 570, may enable the user to customize the order in which the notifications 546a, 546b, 546c are presented in the activity feed 544.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user interface element 552 or by selecting a desired action from a list 554 of recently and/or commonly used microapp actions. As shown, additional resources may also be accessed through the screen 540 by clicking on or otherwise selecting one or more other user interface elements that may be presented on the screen. For example, in some embodiments, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

F. Detailed Description of Example Embodiments of the System Enabling the Keyword-Based Presentation of Notifications Introduced in Section A The techniques described herein enable a user to customize an order in which notifications 546 are presented using keywords. As described above in Section A (with reference to FIGS. 1A-1C), the user 524 may select one or more keywords, based on which the computing system 106 may present notifications 546 relating to the keywords. In accordance with some embodiments of the present disclosure, the computing system 106 may determine recommended keywords for the user 524 to select from. In accordance with some embodiments of the present disclosure, the user 524 may assign a priority level to the keywords, and the computing system 106 may determine an order in which to present notifications 546 based on the assigned priority level.

Figure 6:
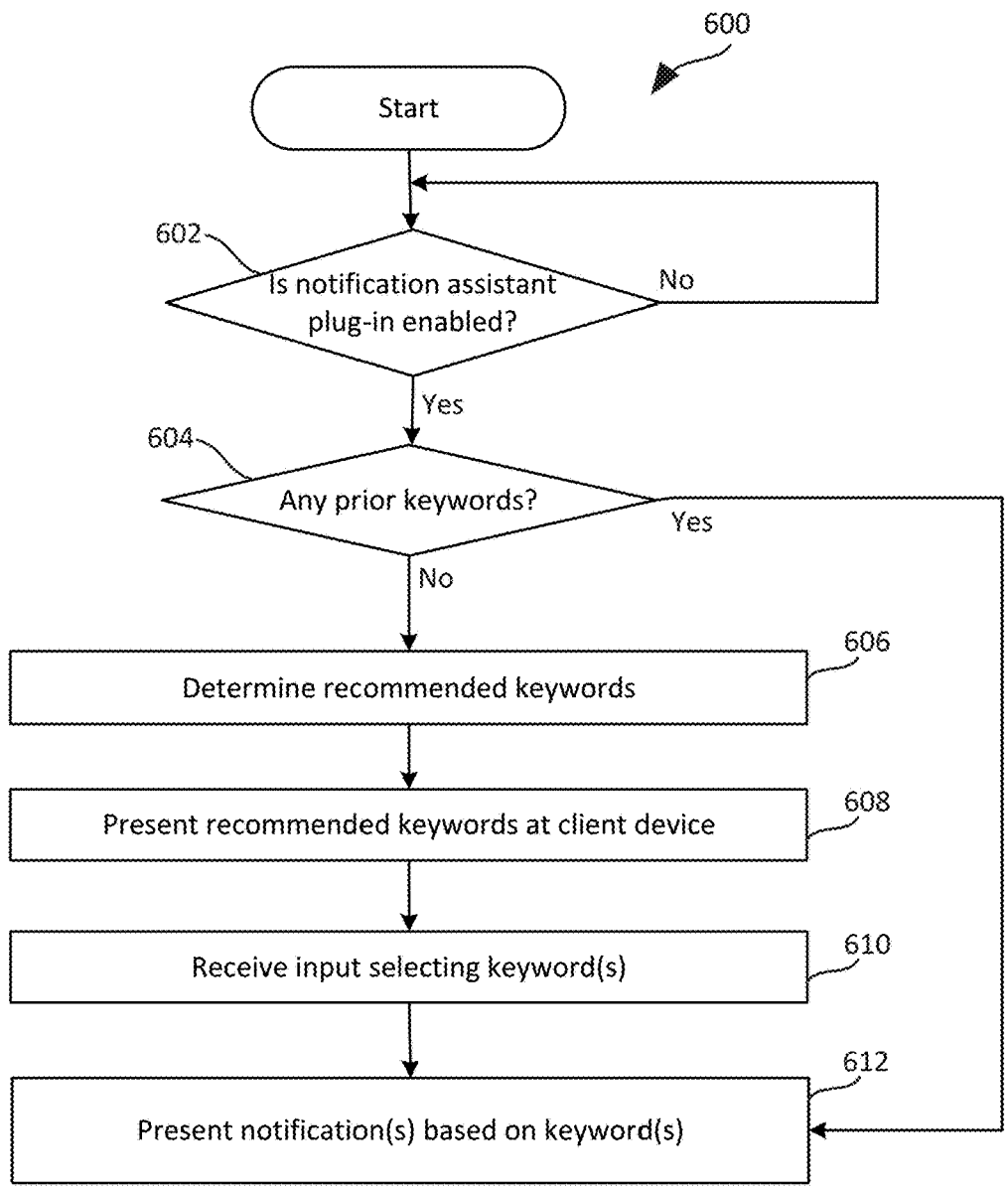
FIG. 6 is flow diagram showing an example routine that may be performed by the computing system shown in FIG. 1A.

FIG. 6 shows an example routine 600 that may be executed by the computing system 106, which may correspond to one or more components of the resource management services 502 shown in FIGS. 5A-5C, to implement the foregoing functionality in accordance with some embodiments of the present disclosure. The computing system 106 may include at least one processor (e.g., processor(s) 302 shown in FIG. 3) and may include at least one computer-readable medium, which may be encoded with instructions which, when executed by the at least one processor of the computing system 106, may cause the computing system 106 to perform the functionality described herein. In some implementations, the example routine 600 may be performed, for example, by the notification service 538, the analytics service 536 or another component shown in FIG. 5C.

Selection of the "Enable Notification Assistant" user interface element 570, shown in FIG. 1B, via the resource access application 522 may enable a plug-in at the client device 202, which may allow the user 524 to provide inputs selecting keywords as described in relation to FIG. 1C. Referring to FIG. 6, the routine 600 may begin when, at a decision step 602, the computing system 106 may determine whether the notification assistant plug-in is enabled at the client device 202.

If the notification assistant plug-in is enabled, then, at a decision step 604, the computing system 106 may determine if there any prior keywords for the user 524. The computing system 106 may, for example, retrieve profile data for the user 524, which may include data representing one or more keywords that are to be used to present notifications. The user 524 may have selected the keyword(s) during a prior interaction with the resource management services 502, and the computing system 106 may have stored the keyword(s) in a user profile for the user 524. If there are one or more prior keywords, the computing system 106 may retrieve the keyword(s), and, at a step 612, the computing system 106 may present one or more notifications 546 based on the keyword(s).

Figure 7:
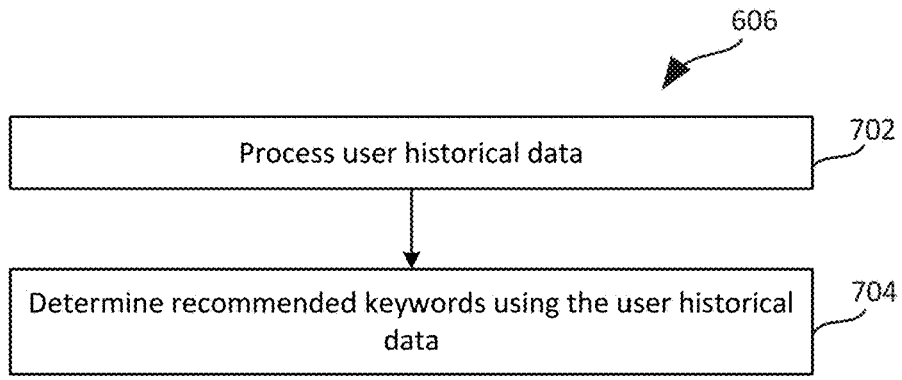
FIG. 7 is flow diagram showing an example routine that may be performed the computing system shown in FIG. 1A.

If there are no prior keywords for the user 524, then, at a step 606, the computing system 106 may determine recommended keywords. FIG. 7 shows example steps that may be performed by the computing system 106 to determine the recommended keywords at the step 606 of the routine 600. Referring to FIG. 7, at a step 702, the computing system 106 may process user historical data for the user 524. The user historical data may, for example, include data representing past notifications 546 presented to the user 524 via the resource access application 522. Such data for individual notifications 546 may, for example, include a time the notification 546 was presented, an application/resource corresponding to the notification 546, and a description of the occurred event (i.e. the notification body). In some implementations, the user historical data may also include data indicating the user's 524 interaction with the notifications 546. Such data may, for example, indicate a time the user 524 interacted with the notification 546 and/or the type of interaction/action the user 524 performed (e.g., opened the notification 546 to receive more information, dismissed/deleted the notification 546, etc.). In some implementations, the computing system 106 may process the user historical data using one or more machine learning models.

At a step 704, the computing system 106 may determine recommended keywords using the user historical data. The computing system 106 may use one or more techniques to determine the keywords from at least the data representing the past notifications 546 presented to the user 524. In an example embodiment, the computing system 106 may use a Latent Dirichlet Allocation (LDA) technique to derive keywords from the past notifications 546. Other techniques may involve determining a word (e.g., a noun) as being a keyword based on how often the word appears in the past notifications 546. Another technique may involve using the data indicating the user's interaction with the past notifications 546 to determine keywords. For example, the recommended keywords may be a word(s) from the past notifications 546 that the user 524 opens within a duration of time of being presented (e.g., the user 524 opens the notification 546 within 1 minute (5 minutes, 10 minutes, etc.) of the notification 546 being presented). Thus, the recommended keywords may be derived from past notifications 546 that the user 524 may consider as important/urgent and interacts with quickly. Another technique may involve filtering out past notifications 546 that the user 524 dismisses/deletes (as determined using the data indicating the user's interaction with the past notifications 546), and determining the recommended keywords using the remaining past notifications 546, thus, the recommended keywords are not related to notifications 546 that the user 524 does not consider important.

Referring again to FIG. 6, at a step 608 of the routine 600, the computing system 106 may present the recommended keywords at the client device 202, for example, via the user interface element 160 shown in FIG. 1C (under the keywords list 162). At a step 610, the computing system 106 may receive one or more inputs selecting one or more keywords. As described above in Section A in relation to FIG. 1C, the user 524 may select one or more keywords and/or may provide the user's own keyword(s) using the user interface element 160. Additionally, the user 524 may assign a priority level to the keyword(s), as described above in Section A in relation to FIG. 1C. The computing system 106 may store data representing the selected keyword(s). The data may also include the priority level assigned to the keyword(s).

In some implementations, the user interface element 160 may display the prior keyword(s) selected by the user 524 during a past interaction session with the resource management services 502. The user 524 may provide an input updating/modifying the prior keyword(s). For example, the user 524 may remove/delete a prior keyword, may assign a different priority level to the prior keyword or may select another keyword. Such inputs may also be received by the computing system 106, and the computing system 106 may update the stored data to reflect any changes (e.g., removal of a keyword, selecting of a new keyword, updating of a priority level, etc.) made by the user 524.

Figure 8:
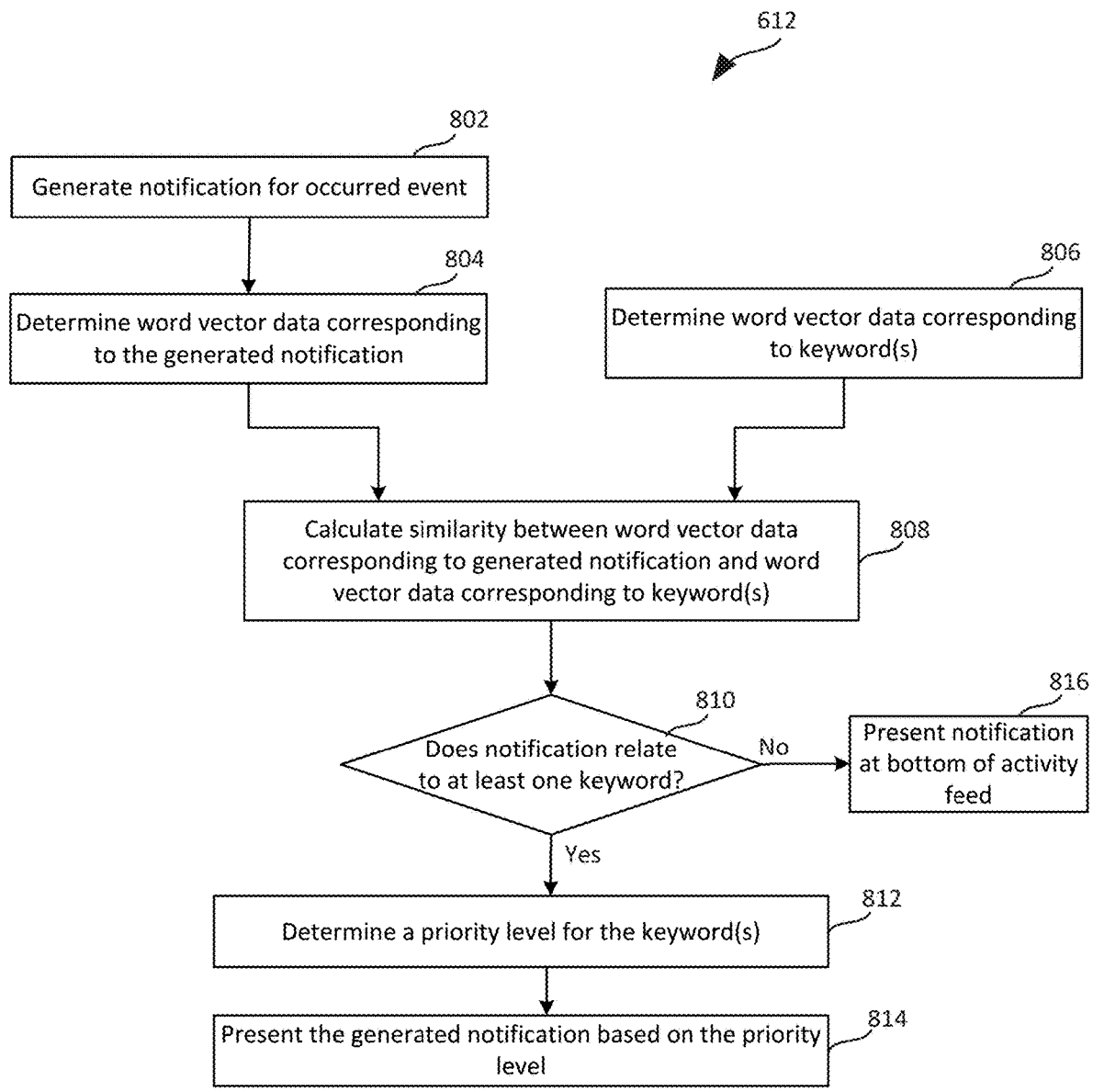
FIG. 8 is flow diagram showing an example routine that may be performed by the computing system shown in FIG. 1A.

At a step 612 of the routine 600, the computing system 106 may present one or more notifications 546 based on the keyword(s) (selected at the step 610, the prior keyword(s) from the decision step 604, or both). FIG. 8 shows example steps that may be performed by the computing system 106 to present the notification(s) 546 based on keyword(s) at the step 612. In some implementations, the computing system 106 may determine a similarity between a notification 546 and the keyword(s) to determine if the notification 546 relates to the keyword(s).

Referring to FIG. 8, at a step 802, the computing system 106 may generate a notification 546 for an occurred event. As described in Section A in relation to FIG. 1A, the computing system 106 may receive data 110 from the systems of record 526 indicating occurrence of an event. The computing system 106 may generate a notification 546 using the data 110. For example, the computing system 106 may cause a notification 546 to indicate a description of the occurred event, an application/resource corresponding to the event, a time the event occurred, and other information.

At a step 804, the computing system 106 may determine word vector data corresponding to the generated notification 546. The computing system 106 may use one or more techniques to determine the word vector data. One technique involves using one or more machine learning models that generate a vector representation for a word (e.g., a word embedding). In some implementations, the computing system 106 may use a word2vec technique that generates a 300-dimension word vector for a word. The computing system 106 may generate a word vector for each word in the notification 546 (e.g., words in the notification body, the application/resource name, and other words), and the word vector data corresponding to the generated notification 546 may be a set of word vectors.

At a step 806, the computing system 106 may determine word vector data corresponding to each keyword selected by the user 524. The computing system 106 may use similar techniques, as described in relation to the step 804, in generating the word vector data for the keywords. In some implementations, the computing system 106 may precompute the word vector data for the keywords, and may store the precomputed word vector data in the profile data for the user 524. When analyzing the generated notification 546, the computing system 106 may retrieve the precomputed word vector data for the keywords from the profile data. The computing system 106 may precompute the word vector data for the keywords after input selecting the keywords is received from the user 524. The computing system 106 may update the precomputed word vector data based on any changes made the user 524 to the selected keywords (which may be provided during a prior interaction session). The computing system 106 may generate a word vector for each keyword, and the word vector data corresponding to the keywords may be a set of word vectors.

At a step 808, the computing system 106 may calculate a similarity between the word vector data corresponding to the generated notification 546 and the word vector data corresponding to the keywords. The computing system 106 may use one or more techniques to calculate the similarity. One technique may involve calculating a cosine similarity.

In some implementations, the computing system 106 may calculate a similarity between the word vector data for the generated notification 546 and the word vector data for one/a first keyword. If the notification 546 is not similar to the first keyword, then the computing system 106 may calculate a similarity between the word vector data for the generated notification 546 and the word vector data for the next/a second keyword. In other implementations, the computing system 106 may calculate a similarity between the word vector data for the generated notification 546 and the word vector data for different keywords in parallel.

At a decision step 810, the computing system 106 may determine whether the notification 546 relates to at least one the keyword. The computing system 106 may make this determination based on the similarity calculated at the step 808. The calculated similarity may be presented as a numerical value within a particular range (e.g., between 0 to 1, 0 to 100, etc.). The higher (or lower) the numerical value, the more similar the notification 546 and the keyword may be. The computing system 106 may determine that the notification 546 is related to a keyword based on the calculated similarity satisfying a condition (e.g., being below a threshold value or being above a threshold value).

In other implementations, the computing system 106 may additionally or alternatively use other techniques to determine whether the notification 546 relates to one or more keywords, for example, a semantic similarity technique, an exact matching technique (where a word in the notification is an exact match to the keyword), or other techniques.

If the notification 546 does not relate to at least one keyword, then at a step 816, the computing system 106 may cause the client device 202 to present the notification 546 at the bottom of the activity feed 544 (shown in FIG. 1B).

If the notification 546 relates to at least one keyword, then at a step 812, the computing system 106 may determine a priority level for the keyword(s). The computing system 106 may, for example, retrieve the priority level information from data stored in the profile data for the user 524, which may be based on the inputs received at the step 610 of the routine 600 shown in FIG. 6.

At a step 814, the computing system 106 may cause the client device 202 to present the generated notification 546 based on the priority level. The computing system 106 may cause the client device 202 to insert the generated notification 546 in the activity feed 544 based on the priority level of the keyword. For example, if the keyword related to the notification 546 is assigned the $1^{st}$ priority level, then the generated notification 546 may presented at the top of the activity feed 544. As a further example, if another notification 546 relates to another keyword that is assigned the $2^{nd}$ priority level, then that other notification 546 may be presented after the notification 546 at the top of the activity feed 544 (relating to the keyword assigned the $1^{st}$ priority level).

As described above, the user 524 may assign a priority level to a keyword to customize the order in which notifications 546 are presented. In other implementations, other techniques may be used to obtain inputs from the user 524 to customize the order in which notifications 546 are presented. For example, instead of the user 524 assigning a priority level to a keyword (as shown in FIG. 1C), the user 524 may rank the selected keywords to indicate the order in which notifications 546 are to be presented. That is, the user 524 may create an ordered/ranked list of keywords, where the first keyword in the list may have "$1^{st}$ rank", the second keyword in the list may have "$2^{nd}$ rank", etc. Such ranks may not be explicitly indicated, but may be derived by the computing system 106 in determining the order in which notifications 546 are to be presented. In this example, a first notification 546 relating to the first keyword may be presented in the activity feed 544 before a second notification 546 relating to the second keyword, based on the order/ranking of the first and second keywords in the list of keywords.

In presenting the notifications 546 at the client device 202, the computing system 106 may cause the resource access application 522 to update the activity feed 544. For example, the activity feed 544 may already present one or more notifications 546 for previously occurred events, and the computing system 106 may cause the resource access application 522 to insert a new notification 546 in the activity feed 544 at the appropriate position based on the keyword and priority level relating to the new notification 546. In some implementations, the computing system 106 may store data tracking the keyword and priority level relating to the notification(s) 546, if any, already presented in the activity feed 544. Such stored data for individual notifications 546 may be a mapping between the notification 546 (which may be identified using a notification id), the keyword and the priority level. For example, the stored data may be {first notification id->first keyword->$1^{st}$ priority level}, {second notification id->second keyword->$2^{nd}$ priority level}, and so on. Using such stored data, the computing system 106 can cause insertion of a new notification 546 in the activity feed 544 at the appropriate position. For example, if the new notification 546 relates to the first keyword assigned the $1^{st}$ priority level, then using the stored data (tracking the already presented notifications) the new notification 546 may be inserted after the first notification 546 and before the second notification 546.

In some implementations, the computing system 106 may employ one or more techniques to resolve conflicts in determining the order in which the notifications 546 are presented. For example, there may be a first notification 546 relating to a keyword with a $1^{st}$ priority level, and a second notification 546 relating to the same keyword with the $1^{st}$ priority level. The computing system 106, in some implementations, may determine to present the first notification 546 before the second notification 546 based on the time that the respective events occurred (i.e., a first event corresponding to the first notification 546 occurred before a second event corresponding to the second notification 546). Alternatively, the computing system 106 may determine to present the first notification 546 after the second notification 546, thus, presenting the most recently occurred event at the top of the activity feed 544. Other techniques may involve alphabetically ordering notifications 546 relating to the same keyword, for example, based on the notification body or based on the application/resource name.

G. Example Implementations of Methods, Systems, and Computer-Readable Media in Accordance with the Present Disclosure The following paragraphs (M1) through (M9) describe examples of methods that may be implemented in accordance with the present disclosure.

(M1) A method may be performed that involves a computing system accessing, using access credentials associated with a user, data associated with systems of record, generating a plurality of notifications of events indicated by the data, determining that the user selected at least one keyword, determining that a first notification of the plurality of notifications relates to the at least one keyword, and causing, based at least in part on the first notification relating to the at least one keyword, a client device operated by the user to present the first notification.

(M2) A method may be performed as described in paragraph (M1), and may further involve the computing system identifying a priority level for the at least one keyword, determining, based on the priority level, an order in which the first notification is to be presented with respect to other notifications presented at the client device, and causing a user interface at the client device to update based on the determined order.

(M3) A method may be performed as described in paragraph (M2), and may further involve the computing system determining that a second notification of the plurality of notifications relates to an additional keyword, identifying an additional priority level for the additional keyword, the additional priority level being lower than the priority level for the at least one keyword, determining, based on the priority level and the additional priority level, that the second notification is to be presented after the first notification, and causing, the user interface at the client device to update so that the second notification is presented after the first notification.

(M4) A method may be performed as described in any of paragraphs (M1) through (M3), wherein determining that the first notification relates to the at least one keyword may further involve the computing system generating first word vector data corresponding to the at least one keyword, generating second word vector data corresponding to each word in the first notification, and determining, using the first word vector data and the second word vector data, that the first notification relates to the at least one keyword.

(M5) A method may be performed as described in any of paragraphs (M1) through (M4), and may further involve receiving, by the computing system and from the client device, an input indicative of the at least one keyword and a priority level for the at least one keyword.

(M6) A method may be performed as described in any of paragraphs (M1) through (M5), and may further involve the computing system processing historical data for the user, the historical data representing past notifications presented to the user, determining, based on processing the historical data, one or more recommended keywords, causing the client device to display the one or more recommended keywords, and receiving, from the client device, an input selecting the at least one keyword from the displayed one or more recommended keywords.

(M7) A method may be performed as described in any of paragraphs (M1) through (M6), and may further involve the computing system determining that a second notification of the plurality of notifications does not relate to the at least one keyword, and causing the client device to refrain from presenting the second notification.

(M8) A method may be performed as described in any of paragraphs (M1) through (M7), and may further determining that a second notification of the plurality of notifications does not relate to the at least one keyword, and causing the client device to present the second notification after the first notification.

(M9) A method may be performed as described in any of paragraphs (M1) through (M8), and may further involve determining that a second notification of the plurality of notifications relates to the at least one keyword, determining that a first event corresponding to the first notification occurs after a second event corresponding to the second notification, and causing, based on the first event occurring after the second event, the client device to present the second notification after the first notification.

The following paragraphs (S1) through (S9) describe examples of systems and devices that may be implemented in accordance with the present disclosure.

(S1) A computing system may comprise at least one processor and at least one computer-readable medium encoded with instructions which, when executed by the at least one processor, cause the computing system to access, using access credentials associated with a user, data associated with systems of record, generate a plurality of notifications of events indicated by the data, determine that the user selected at least one keyword, determine that a first notification of the plurality of notifications relates to the at least one keyword, and cause, based at least in part on the first notification relating to the at least one keyword, a client device operated by the user to present the first notification.

(S2) A computing system may be configured as described in paragraph (S1), wherein the at least one computer-readable medium may be further encoded with additional instructions which, when executed by the at least one processor, further cause the computing system to identify a priority level for the at least one keyword, determine, based on the priority level, an order in which the first notification is to be presented with respect to other notifications presented at the client device, and cause a user interface at the client device to update based on the determined order.

(S3) A computing system may be configured as described in paragraph (S2), wherein the at least one computer-readable medium may be further encoded with additional instructions which, when executed by the at least one processor, further cause the computing system to determine that a second notification of the plurality of notifications relates to an additional keyword, identify an additional priority level for the additional keyword, the additional priority level being lower than the priority level for the at least one keyword, determine, based on the priority level and the additional priority level, that the second notification is to be presented after the first notification, and cause the user interface at the client device to update so that the second notification is presented after the first notification.

(S4) A computing system may be configured as described in any of paragraphs (S1) through (S3), wherein the at least one computer-readable medium may be further encoded with additional instructions which, when executed by the at least one processor, further cause the computing system to generate first word vector data corresponding to the at least one keyword, generate second word vector data corresponding to each word in the first notification, and determine, using the first word vector data and the second word vector data, that the first notification relates to the at least one keyword.

(S5) A computing system may be configured as described in any of paragraphs (S1) through (S4), wherein the at least one computer-readable medium may be further encoded with additional instructions which, when executed by the at least one processor, further cause the computing system to receive, from the client device, an input indicative of the at least one keyword and a priority level for the at least one keyword.

(S6) A computing system may be configured as described in any of paragraphs (S1) through (S5), wherein the at least one computer-readable medium may be further encoded with additional instructions which, when executed by the at least one processor, further cause the computing system to process historical data for the user, the historical data representing past notifications presented to the user, determine, based on processing the historical data, one or more recommended keywords, cause the client device to display the one or more recommended keywords, and receive, from the client device, an input selecting the at least one keyword from the displayed one or more recommended keywords.

(S7) A computing system may be configured as described in any of paragraphs (S1) through (S6), wherein the at least one computer-readable medium may be further encoded with additional instructions which, when executed by the at least one processor, further cause the computing system to determine that a second notification of the plurality of notifications does not relate to the at least one keyword, and cause the client device to refrain from presenting the second notification.

(S8) A computing system may be configured as described in any of paragraphs (S1) through (S7), wherein the at least one computer-readable medium may be further encoded with additional instructions which, when executed by the at least one processor, further cause the computing system to determine that a second notification of the plurality of notifications does not relate to the at least one keyword, and cause the client device to present the second notification after the first notification.

(S9) A computing system may be configured as described in any of paragraphs (S1) through (S8), wherein the at least one computer-readable medium may be further encoded with additional instructions which, when executed by the at least one processor, further cause the computing system to determine that a second notification of the plurality of notifications relates to the at least one keyword, determine that a first event corresponding to the first notification occurs after a second event corresponding to the second notification, and cause, based on the first event occurring after the second event, the client device to present the second notification after the first notification.

The following paragraphs (CRM1) through (CRM9) describe examples of computer-readable media that may be implemented in accordance with the present disclosure.

(CRM1) At least one non-transitory computer-readable medium may be encoded with instructions which, when executed by at least one processor of a computing system, may cause the computing system to access, using access credentials associated with a user, data associated with systems of record, generate a plurality of notifications of events indicated by the data, determine that the user selected at least one keyword, determine that a first notification of the plurality of notifications relates to the at least one keyword, and cause, based at least in part on the first notification relating to the at least one keyword, a client device operated by the user to present the first notification.

(CRM2) At least one non-transitory computer-readable medium may be configured as described in paragraph (CRM1), and may be further encoded with additional instructions which, when executed by the at least one processor, further cause the computing system to identify a priority level for the at least one keyword, determine, based on the priority level, an order in which the first notification is to be presented with respect to other notifications presented at the client device, and cause a user interface at the client device to update based on the determined order.

(CRM3) At least one non-transitory computer-readable medium may be configured as described in paragraph (CRM2), and may be further encoded with additional instructions which, when executed by the at least one processor, further cause the computing system to determine that a second notification of the plurality of notifications relates to an additional keyword, identify an additional priority level for the additional keyword, the additional priority level being lower than the priority level for the at least one keyword, determine, based on the priority level and the additional priority level, that the second notification is to be presented after the first notification, and cause the user interface at the client device to update so that the second notification is presented after the first notification.

(CRM4) At least one non-transitory computer-readable medium may be configured as described in any of paragraphs (CRM1) through (CRM3), and may be further encoded with additional instructions which, when executed by the at least one processor, further cause the computing system to generate first word vector data corresponding to the at least one keyword, generate second word vector data corresponding to each word in the first notification, and determine, using the first word vector data and the second word vector data, that the first notification relates to the at least one keyword.

(CRM5) At least one non-transitory computer-readable medium may be configured as described in any of paragraphs (CRM1) through (CRM4), and may be further encoded with additional instructions which, when executed by the at least one processor, further cause the computing system to receive, from the client device, an input indicative of the at least one keyword and a priority level for the at least one keyword.

(CRM6) At least one non-transitory computer-readable medium may be configured as described in any of paragraphs (CRM1) through (CRM5), and may be further encoded with additional instructions which, when executed by the at least one processor, further cause the computing system to process historical data for the user, the historical data representing past notifications presented to the user, determine, based on processing the historical data, one or more recommended keywords, cause the client device to display the one or more recommended keywords, and receive, from the client device, an input selecting the at least one keyword from the displayed one or more recommended keywords.

(CRM7) At least one non-transitory computer-readable medium may be configured as described in paragraph (CRM6), and may be further encoded with additional instructions which, when executed by the at least one processor, further cause the computing system to determine that a second notification of the plurality of notifications does not relate to the at least one keyword, and cause the client device to refrain from presenting the second notification.

(CRM8) At least one non-transitory computer-readable medium may be configured as described in any of paragraphs (CRM1) through (CRM7), and may be further encoded with additional instructions which, when executed by the at least one processor, further cause the computing system to determine that a second notification of the plurality of notifications does not relate to the at least one keyword, and cause the client device to present the second notification after the first notification.

(CRM9) At least one non-transitory computer-readable medium may be configured as described in any of paragraphs (CRM1) through (CRM8), and may be further encoded with additional instructions which, when executed by the at least one processor, further cause the computing system to determine that a second notification of the plurality of notifications relates to the at least one keyword, determine that a first event corresponding to the first notification occurs after a second event corresponding to the second notification, and cause, based on the first event occurring after the second event, the client device to present the second notification after the first notification.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
accessing, by a computing system and using access credentials associated with a user, data associated with systems of record;
generating, by the computing system, a plurality of notifications of events indicated by the data;
determining, by the computing system, that the user selected at least one keyword;
determining, by the computing system, that a first notification of the plurality of notifications relates to the at least one keyword; and
causing, by the computing system and based at least in part on the first notification relating to the at least one keyword, a client device operated by the user to present the first notification.

2. The method of claim 1, further comprising:
identifying, by the computing system, a priority level for the at least one keyword;
determining, by the computing system and based on the priority level, an order in which the first notification is to be presented with respect to other notifications presented at the client device; and causing, by the computing system, a user interface at the client device to update based on the determined order.

3. The method of claim 2, further comprising:
determining, by the computing system, that a second notification of the plurality of notifications relates to an additional keyword;
identifying, by the computing system, an additional priority level for the additional keyword, the additional priority level being lower than the priority level for the at least one keyword;
determining, by the computing system and based on the priority level and the additional priority level, that the second notification is to be presented after the first notification; and
causing, by the computing system, the user interface at the client device to update so that the second notification is presented after the first notification.

4. The method of claim 1, wherein determining that the first notification relates to the at least one keyword comprises:
generating, by the computing system, first word vector data corresponding to the at least one keyword;
generating, by the computing system, second word vector data corresponding to each word in the first notification; and
determining, by the computing system and using the first word vector data and the second word vector data, that the first notification relates to the at least one keyword.

5. The method of claim 1, further comprising:
receiving, by the computing system and from the client device, an input indicative of the at least one keyword and a priority level for the at least one keyword.

6. The method of claim 1, further comprising:
processing, by the computing system, historical data for the user, the historical data representing past notifications presented to the user and user interactions with the past notifications;
determining, by the computing system and based on processing the historical data, one or more recommended keywords;
causing, by the computing system, the client device to display the one or more recommended keywords; and
receiving, by the computing system and from the client device, an input selecting the at least one keyword from the displayed one or more recommended keywords.

7. The method of claim 1, further comprising:
determining, by the computing system, that a second notification of the plurality of notifications does not relate to the at least one keyword; and
causing, by the computing system, the client device to refrain from presenting the second notification.

8. The method of claim 1, further comprising:
determining, by the computing system, that a second notification of the plurality of notifications does not relate to the at least one keyword; and
causing, by the computing system, the client device to present the second notification after the first notification.

9. The method of claim 1, further comprising:
determining, by the computing system, that a second notification of the plurality of notifications relates to the at least one keyword;
determining, by the computing system, that a first event corresponding to the first notification occurs after a second event corresponding to the second notification; and causing, by the computing system and based on the first event occurring after the second event, the client device to present the second notification after the first notification.

10. A computing system, comprising:
at least one processor; and
at least one computer-readable medium encoded with instructions which, when executed by the at least one processor, cause the computing system to:
access, using access credentials associated with a user, data associated with systems of record;
generate a plurality of notifications of events indicated by the data;
determine that the user selected at least one keyword;
determine that a first notification of the plurality of notifications relates to the at least one keyword; and
cause, based at least in part on the first notification relating to the at least one keyword, a client device operated by the user to present the first notification.

11. The computing system of claim 10, wherein the at least one computer-readable medium is further encoded with additional instructions which, when executed by the at least one processor, further cause the computing system to:
identify a priority level for the at least one keyword;
determine, based on the priority level, an order in which the first notification is to be presented with respect to other notifications presented at the client device; and
cause a user interface at the client device to update based on the determined order.

12. The computing system of claim 11, wherein the at least one computer-readable medium is further encoded with additional instructions which, when executed by the at least one processor, further cause the computing system to:
determine that a second notification of the plurality of notifications relates to an additional keyword;
identify an additional priority level for the additional keyword, the additional priority level being lower than the priority level for the at least one keyword;
determine, based on the priority level and the additional priority level, that the second notification is to be presented after the first notification; and
cause the user interface at the client device to update so that the second notification is presented after the first notification.

13. The computing system of claim 10, wherein the at least one computer-readable medium is further encoded with additional instructions which, when executed by the at least one processor, further cause the computing system to:
generate first word vector data corresponding to the at least one keyword;
generate second word vector data corresponding to each word in the first notification; and
determine, using the first word vector data and the second word vector data, that the first notification relates to the at least one keyword.

14. The computing system of claim 10, wherein the at least one computer-readable medium is further encoded with additional instructions which, when executed by the at least one processor, further cause the computing system to:
receive, from the client device, an input indicative of the at least one keyword and a priority level for the at least one keyword.

15. The computing system of claim 10, wherein the at least one computer-readable medium is further encoded with additional instructions which, when executed by the at least one processor, further cause the computing system to:

process historical data for the user, the historical data representing past notifications presented to the user and user interactions with the past notifications;

determine, based on processing the historical data, one or more recommended keywords;

cause the client device to display the one or more recommended keywords; and receive, from the client device, an input selecting the at least one keyword from the displayed one or more recommended keywords.

16. The computing system of claim 10, wherein the at least one computer-readable medium is further encoded with additional instructions which, when executed by the at least one processor, further cause the computing system to:

determine that a second notification of the plurality of notifications does not relate to the at least one keyword; and cause the client device to refrain from presenting the second notification.

17. The computing system of claim 10, wherein the at least one computer-readable medium is further encoded with additional instructions which, when executed by the at least one processor, further cause the computing system to:

determine that a second notification of the plurality of notifications does not relate to the at least one keyword; and cause the client device to present the second notification after the first notification.

18. The computing system of claim 10, wherein the at least one computer-readable medium is further encoded with additional instructions which, when executed by the at least one processor, further cause the computing system to:

determine that a second notification of the plurality of notifications relates to the at least one keyword;

determine that a first event corresponding to the first notification occurs after a second event corresponding to the second notification; and cause, based on the first event occurring after the second event, the client device to present the second notification after the first notification.

19. At least one non-transitory computer-readable medium encoded with instructions which, when executed by at least one processor of a computing system, cause the computing system to:

access, using access credentials associated with a user, data associated with systems of record;

generate a plurality of notifications of events indicated by the data;

determine that the user selected at least one keyword;

determine that a first notification of the plurality of notifications relates to the at least one keyword; and cause, based at least in part on the first notification relating to the at least one keyword, a client device operated by the user to present the first notification.

20. The at least one non-transitory computer-readable medium of claim 19, wherein the instructions which, when executed by the at least one processor of the computing system, further cause the computing system to:

identify a priority level for the at least one keyword;

determine, based on the priority level, an order in which the first notification is to be presented with respect to other notifications presented at the client device; and cause a user interface at the client device to update based on the determined order.

* * * * *